United States Patent [19]

Stockton

[11] Patent Number: 4,856,369
[45] Date of Patent: Aug. 15, 1989

[54] CONTINUALLY VARIABLE TRANSMISSION HAVING TORQUE REGENERATION OPERATING MODE

[75] Inventor: Thomas R. Stockton, Ann Arbor, Mich.

[73] Assignee: Ford Motor Company, Dearborn, Mich.

[21] Appl. No.: 138,466

[22] Filed: Dec. 28, 1987

[51] Int. Cl.⁴ ............................................. F16H 37/00
[52] U.S. Cl. .................. 74/665 GE; 74/689; 74/695; 74/763; 74/681
[58] Field of Search ................ 74/679, 689, 681, 793, 74/694, 695, 762, 763, 665 GE

[56] References Cited

U.S. PATENT DOCUMENTS

| | | | |
|---|---|---|---|
| 3,340,749 | 9/1967 | Magg et al. | 74/689 |
| 4,290,320 | 9/1981 | Abbott | 74/689 |
| 4,458,558 | 7/1984 | Frank | 74/665 GE |
| 4,539,866 | 9/1985 | Koivunen | 74/695 |
| 4,553,450 | 11/1985 | Gizard | 74/665 GE X |
| 4,589,303 | 5/1986 | Roberts | 74/695 X |
| 4,624,153 | 11/1986 | Itoh et al. | 74/695 X |
| 4,633,736 | 1/1987 | Sakakihara et al. | 74/689 |
| 4,644,820 | 2/1987 | Macey et al. | 74/689 |
| 4,644,821 | 2/1987 | Sumiyoshi et al. | 74/689 |

FOREIGN PATENT DOCUMENTS

245079 11/1987 European Pat. Off. ............. 74/695

*Primary Examiner*—Leslie A. Braun
*Assistant Examiner*—Christopher C. Campbell
*Attorney, Agent, or Firm*—Frank G. McKenzie; Donald J. Harrington

[57] ABSTRACT

A continually variable transmission includes a fluid coupling having an impeller driven from a power source and a turbine adapted to be driven hydrodynamically from the impeller or to be connected mechanically to the impeller by a lockup clutch. The turbine drives the shaft on which a sprocket wheel of a constant speed ratio chain drive mechanism and a sheave of a variable ratio belt drive mechanism are rotatably carried. The output sprocket of the chain drive mechanism is connected through a regeneration mode clutch to the ring gear of a dual planetary gearset. The output sheave of the belt drive mechanism is connected directly to the sun gear of the planetary gearset or through a first mode clutch to the carrier of the gearset, on which the first and second sets of planetary pinions are rotatably mounted. The reverse brake selectively holds the ring gear to produce reverse drive. The transmission accelerates the vehicle from rest by disengaging the regeneration clutch and engaging the first mode clutch. The mode of operation can be shifted by reversing the engagement of these clutches when the speeds of their components become substantially synchronous upon changing the belt ratio to the ratio of the fixed chain drive mechanism. A one-way clutch permits the chain drive mechanism to overrun in the first mode and to become locked in the second mode. The belt drive mechanism drives the ring gear from the fluid coupling turbine in the first mode and drives the input sprocket of the chain drive mechanism from the ring gear in the regeneration mode.

16 Claims, 4 Drawing Sheets

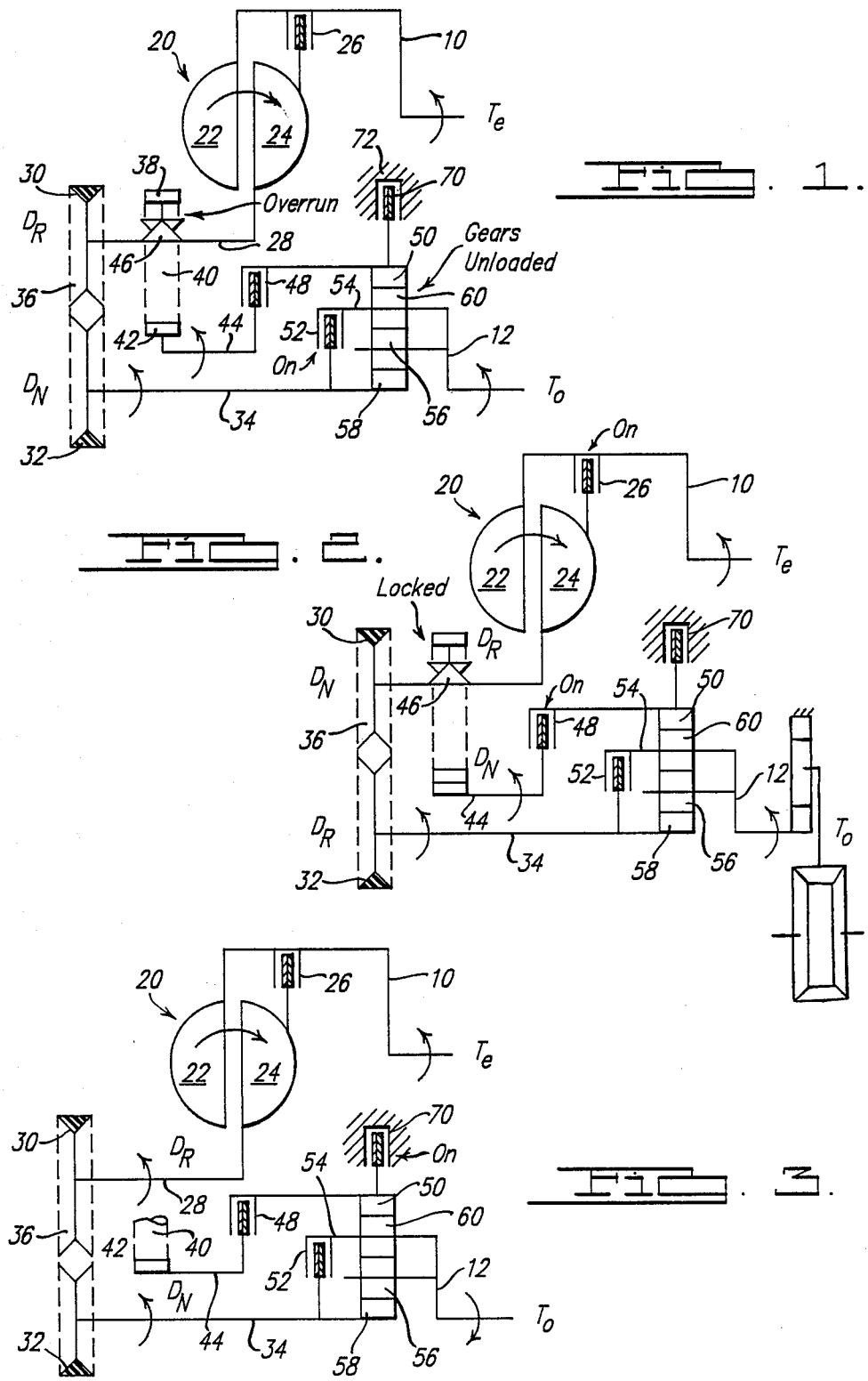

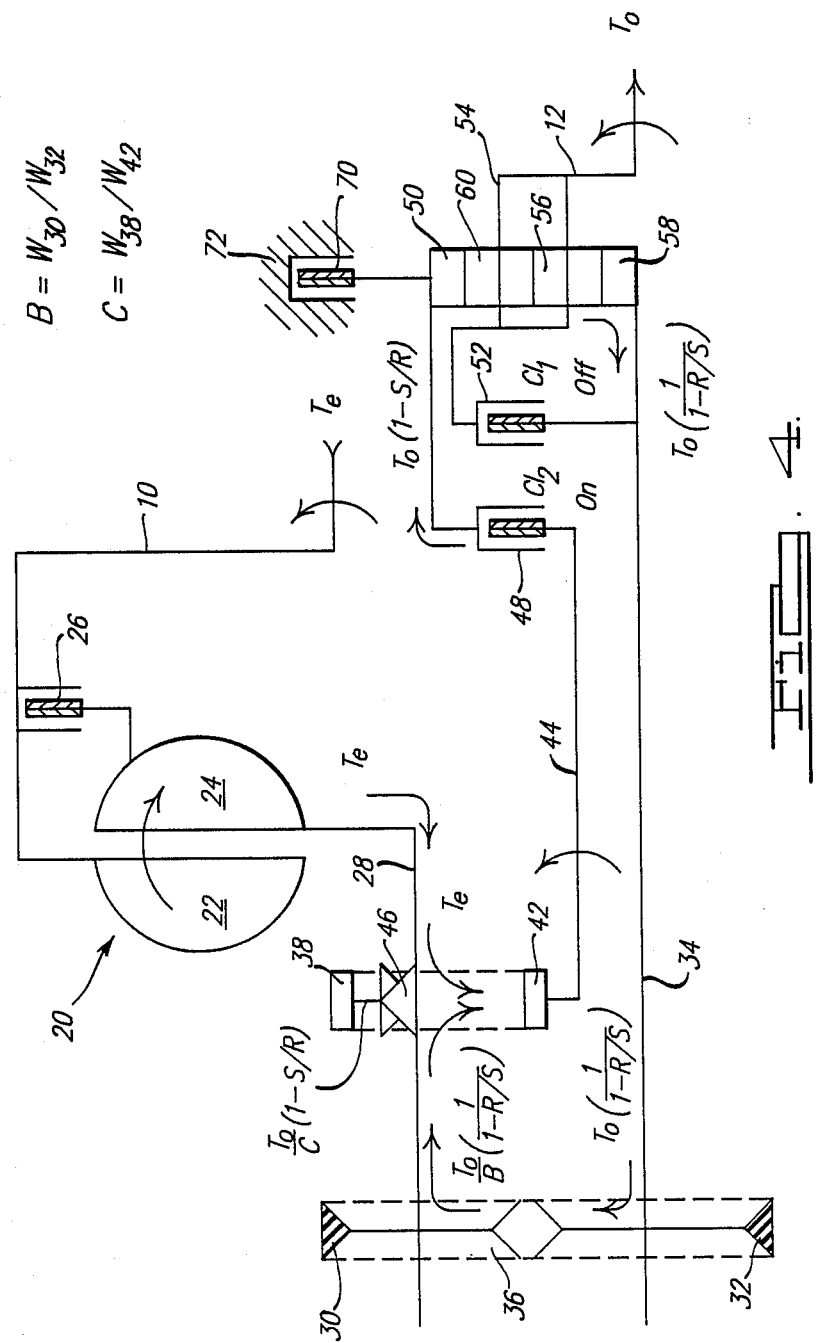

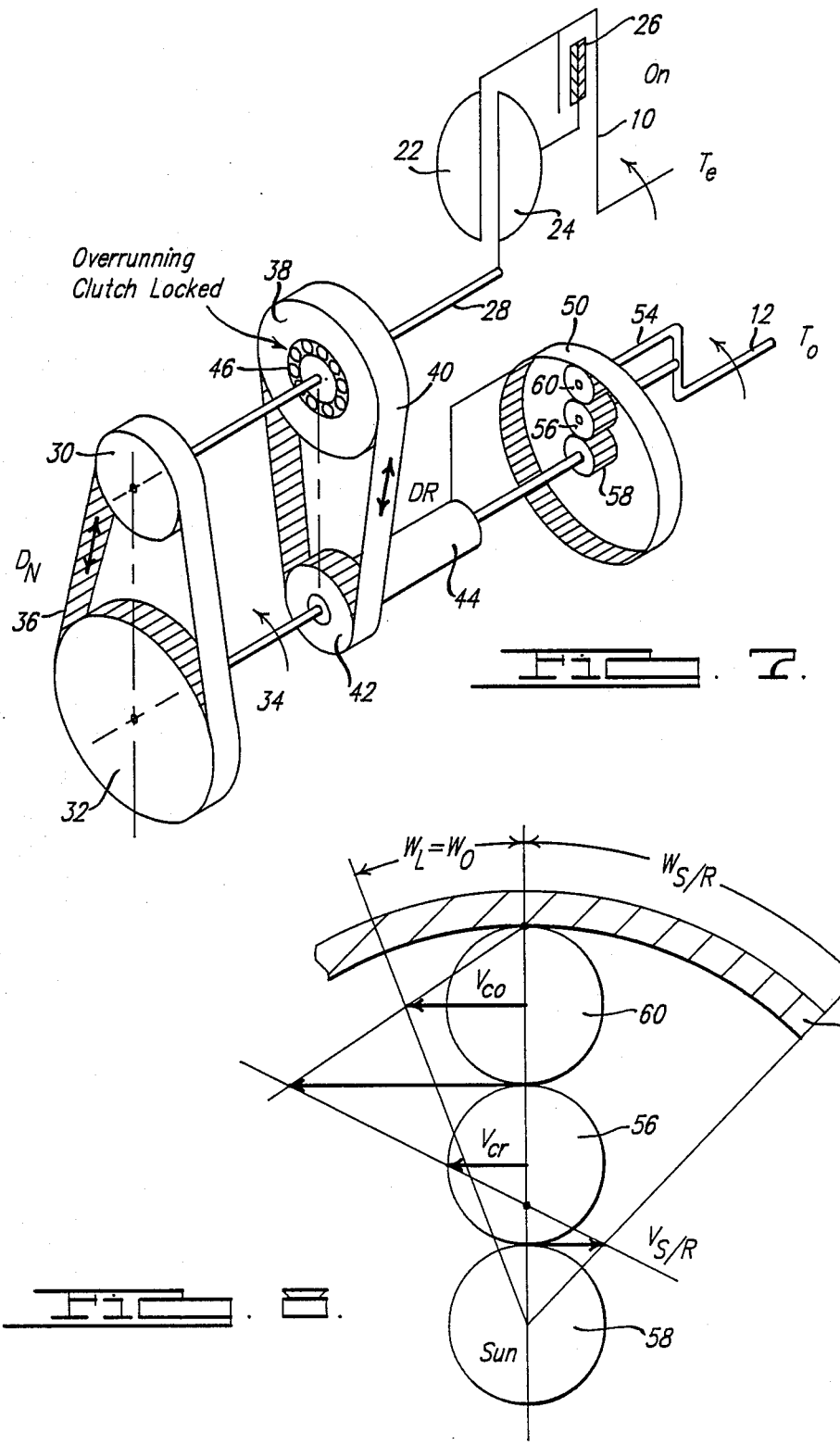

4,856,369

CONTINUALLY VARIABLE TRANSMISSION HAVING TORQUE REGENERATION OPERATING MODE

BACKGROUND OF THE INVENTION

1. Field of the Invention.

This invention relates to the field of continually variable transmissions that produce stepless speed ratio changes. More particularly, the invention pertains to such transmissions having fixed ratio and variable ratio drive mechanisms, which regenerate torque and extend the range of the transmission speed ratio.

2. Description of the Prior Art

Automatic transmissions for automotive use that employ a belt drive variable speed ratio mechanism usually include a torque converter located in the driveline between the power source and a variable drive mechanism, or between a forward and reverse gear set and the variable drive mechanism. At the lower speed ratios, the torque converter produces torque multiplication to assist in accelerating the vehicle from rest. At higher speed ratios, the torque converter is locked up to produce a mechanical connection between its input and output, rather than the conventional hydrodynamic connection, to avoid the losses inherent in its operation. At the higher speed ratios, the belt drive mechanism alone produces the torque multiplication and speed reduction between the power source and drive wheels.

It is preferred that the added expense of a torque converter and the inherent hydrodynamic losses associated with its operation be avoided in a continually variable transmission by using, in place of the torque converter, a fluid coupling, which like a torque converter, can attenuate driveline vibrations and avoid operating harshness. However, an inherent disadvantage in merely substituting a fluid coupling for a torque converter is the loss of the torque multiplication that the torque converter can provide.

A compound planetary gearset can be operated with a variable belt driven mechanism and a fixed ratio drive mechanism in a torque regeneration mode to produce torque multiplication at lower speed ratios when its sun gear and ring gear are driven and a planet carrier is used as the output of the gearset.

A compound planetary gearset can be operated also in a geared neutral condition where the speed of the ring gear is the same multiple of the speed of its sun gear as the diameter of the ring gear is of the diameter of the sun gear. The speed ratio of the gearset is increased from the geared neutral speed ratio when the sun gear is driven at a lower multiple of the ring gear speed than the ratio of the diameters of the sun gear and ring gear. An increase in the speed of the sun gear in relation to the speed of the ring gear from the geared neutral relation between these speeds produces a speed ratio that passes through zero and becomes negative. The gearset can be operated in this manner to produce reverse drive and forward drive. However, in certain conditions near the zero speed ratio condition, the torques carried by the mechanisms that drive the gearset inputs can rise to enormous levels, in excess of their ability to carry the load.

SUMMARY OF THE INVENTION

A continually variable transmission according to this invention includes a fluid coupling or torque converter having an impeller driven from a power source and a turbine hydrodynamically driven by the impeller and adapted, through operation of lockup clutch, to be mechanically connected directly to the power source. A compound planetary gearset has its sun gear driven from the output sheave of a belt drive mechanism, which produces a variable speed ratio range, and its ring gear connected to the output sprocket wheel of a chain drive mechanism, which produces a constant speed ratio. Either of the input or output sprocket wheels of the fixed ratio drive mechanism is mounted on an overrunning clutch to produce a one-way drivable connection between the shaft on which it is rotatably supported and the corresponding sprocket wheel. The belt drive mechanism produces a variable speed ratio range by continually changing the radius on its input and output sheaves where an endless drive belt engages the sheaves. The output sheave of the belt drive mechanism is connected directly to the sun gear of the planetary gearset. A first mode clutch is engaged to connect the output sheave of the belt mechanism also to the carrier of the planetary gearset, on which first and second planetary pinion sets are rotatably mounted. A final drive gearset connects the carrier of the planetary gearset to a differential mechanism through speed reduction gearing, by which of the drive wheels of the vehicle are powered.

The belt drive mechanism has a speed ratio range from its maximum underdrive position to its minimum underdrive position, i.e., its maximum overdrive position, of approximately 6:1. The mode in which the transmission operates is shifted between a first mode and a regeneration mode when the belt ratio is at its minimum underdrive ratio, which is substantially equal to the drive ratio of the chain mechanism. When this condition exists, the components of the first mode clutch and the regeneration mode clutch are substantially synchronous and carry substantially the same amount of torque before and after the mode change, thereby facilitating the change of operating mode without the impact and harshness normally associated with a mode change in an automotive continually variable transmission or in an automatic transmission of conventional design.

A vehicle operated with a transmission according to this invention is accelerated from rest in the forward direction when the belt ratio is at the maximum underdrive position, the low mode clutch is engaged, and the high mode or regeneration mode clutch is disengaged. With the transmission so disposed, the sun gear of the planetary gearset is driven at a speed corresponding to the belt speed ratio and the engine speed, and the carrier is driven at the sun gear speed. As the belt ratio is reduced, the sun gear and the carrier continually increase for a constant engine speed, and the ring gear remains disconnected by the regeneration mode clutch from the chain drive mechanism.

At the synchronous point, the mode change occurs. Thereafter, the ring gear is driven through the chain drive mechanism, the carrier is disconnected from the belt drive mechanism output, but the sun gear remains connected to the output sheave of the belt drive mechanism. In the regeneration mode, torque from the engine and torque carried by the sun gear are applied to the shaft on which the input sheave of the belt drive mechanism and the input sprocket of the chain drive mechanism are rotatably supported. These torques combine to produce a torque that is carried by the chain drive through the regeneration clutch to the ring gear. The carrier is driven at a torque equal to the difference between the ring gear torque and the sun gear torque regenerated through the belt drive mechanism. In the regeneration mode, the speed ratio of the belt mechanism is increased from its minimum value toward the maximum value, thereby increasing the vehicle speed in relation to the engine speed.

BRIEF DESCRIPTION OF THE DRAWINGS

FIG. 1 is a schematic diagram of a continually variable transmission showing the belt drive mechanism, chain drive mechanism, gearset, brakes and clutches operating in forward drive in the first mode.

FIG. 2 is a schematic diagram of the transmission of FIG. 1 showing the clutches engaged for operating the transmission in the second mode in forward drive.

FIG. 3 is the transmission of FIG. 1 showing the reverse clutch engaged for operating the transmission in the first mode with reverse drive.

FIG. 4 is a schematic diagram of the transmission of FIG. 1 operating in the regenerative, second mode showing the torque flow through the transmission and algebraic expressions for the torque stated in terms of the belt ratio, chain ratio and sun gear and ring gear diameters.

FIG. 7 is a isometric diagram of the transmission according to this invention.

FIG. 8 is a vector diagram of the linear speeds of the components of the dual planetary gearset.

DESCRIPTION OF THE PREFERRED EMBODIMENT

Figure 5:
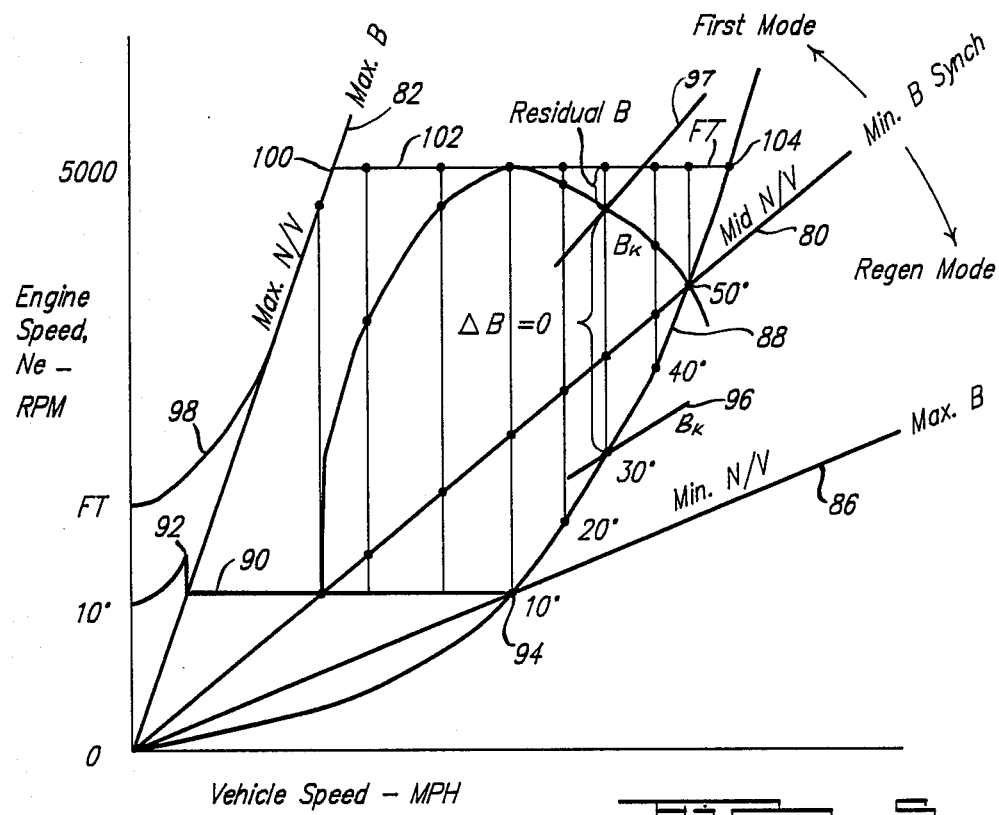
FIG. 5 is a diagram showing the relationship between engine speed and vehicle speed for a continually variable transmission according to the this invention operating in the first mode and second mode through the full range of drive ratios.

Referring first to FIG. 1, a transmission according to this invention includes an input 10 drivably connected to a power source and an output 12, which is either directly connected to the spindle of a differential mechanism or to a final drive gearset, as in FIG. 2.

A fluid coupling or torque converter 20 has an impeller 22 hydrodynamically connected to a turbine 24. A bypass clutch 26 is engaged to mechanically connect the turbine and impeller or is disengaged so that the connection between the impeller and turbine is entirely hydrodynamic. The turbine rotates on a shaft 28, which supports the input sheave 30 of a belt drive mechanism, whose output sheave 32 is rotatably supported on shaft 34. The belt drive mechanism produces a variable ratio of the speed of shaft 34 to shaft 28 by selectively varying the radii on sheaves 30 and 32 where an endless flexible belt 36 engaged the sheaves. For example, when shaft 34 is underdriven, the belt engages sheave 30 at a small radius and engages sheave 32 at a relatively large radius.

Shaft 28 also supports the input sprocket wheel 38 on a second constant speed ratio chain drive mechanism, which includes a chain 40 drivably connecting sprocket 38 and sprocket 42, which is supported rotatably on shaft 44. A one-way clutch 46 can be mounted on shaft 44 so that sprocket 42 is carried on the clutch, or clutch 46 is located on shaft 36 on that sprocket 38 is supported on the one-way clutch.

A regeneration mode or second mode clutch 48 is located in the driveline between shaft 44 and a ring gear 50. When clutch 48 is engaged, it drivably connects the ring gear 50 and shaft 44. A first mode or low speed ratio clutch 52 drivably connects shaft 34 and a carrier 54, on which are rotatably supported a first set of planet pinions 56, continually engaged with a sun gear 58, and a second set of planet pinions 60, continually in mesh with the first planet pinion set and with ring gear 50.

A reverse brake 70 has one member fixed to the transmission casing at 72 and a second member drivably connected to ring gear 50. When brake 70 is applied, the ring gear is held against rotation on the transmission casing.

The belt drive ratio B is equal to the quotient that results from dividing the speed of shaft 28 by that of shaft 34. The chain drive ratio C is the quotient that results from dividing the speed of shaft 28 by that of shaft 44. Ideally, the range of the belt drive mechanism is 6:1, the maximum value for B is 2.45; its minimum value is 0.408. Therefore, when the belt drive mechanism is set for operation at the maximum underdrive position, B equals 2.45, and when it operates at the maximum overdrive position, B equals 0.408. Preferably, the minimum speed ratio produced by the first drive mechanism is substantially equal to the constant speed ratio of the second drive mechanism, 0.408.

When the transmission operates in the first mode, the sun gear and carrier of the compound planetary gearset are driven through the fluid coupling and the variable ratio belt drive mechanism. The ring gear of the compound planetary gearset is disconnected from the fixed speed ratio drive mechanism because regeneration mode clutch 48 is disengaged.

A vehicle driven through this transmission is accelerated from rest when first mode clutch 52 is engaged, second mode clutch 48 is disengaged, reverse brake 70 is disengaged and lockup clutch 26 is disengaged. The vehicle is accelerated from rest by setting the belt drive in the maximum underdrive position, whereupon carrier 54 and the output 12 are driven at the speed shaft 34 through first mode clutch 52. For a contant engine speed, as the belt ratio decreases, the speed of the output 12 increases. The chain ratio is substantially equal to the minimum belt ratio; therefore, as the belt ratio declines toward 0.048, the ring gear speed approaches the speed of shaft 44. Eventually, these speeds become equal when the belt drive mechanism reaches its minimum value. This is the synchronous speed ratio or shift point between the first mode and second mode. When the speeds of the members of clutches 52 and 48 are substantially equal, first mode clutch 52 is disengaged and second mode clutch 48 is engaged. Thereore, little, if any, impact occurs because the driving and driven members of the clutches are at the same speed. The torque on the belt drive mechanism and the output torque are substantially unchanged immediately before and after the shift point. The engine speed is unchanged, but the torque on the belt drive mechanism reverses direction.

FIG. 2 shows the operation of the transmission in the second mode, wherein clutch 48 is engaged, overrunning clutch 46 is locked and clutch 26 is engaged, preferably at the engine speed that corresponds to the coupling point of the hydraulic coupling 20.

FIG. 3 represents the operation of the transmission when used to accelerate the vehicle from rest in reverse drive. In this condition, clutches 48, 52 and 26 are disengaged but reverse brake 70 is applied. The vehicles is accelerated from rest in reverse drive by positioning the belt drive mechanism in the maximum underdrive position where B is equal to 2.45. Brake 70 holds ring gear 50 against rotation so that the direction of rotation of carrier 54 and output 12 are reversed from the forward drive direction.

Operation of the transmission in the second mode is described in more detail with reference to FIG. 4. In the regenerative mode, the second mode, lockup clutch 26 is engaged, reverse brake 70 is disengaged, low mode clutch 52 is disengaged and regenerative clutch 48 is enaged. Engine torque Te is carried by lockup clutch 26 from the input 10 to shaft 28. The ring gear 50 is driven through clutch 48 and the chain drive mechanism by torque, whose magnitude stated in terms of the sun gear pitch diameter S and ring gear pitch diameter D is $$To (1-S/R)$$

Sun gear 58 drives shaft 34 with torque $$To/(1-R/S)$$

The difference between the torque that drives the ring gear and the torque carried by the sun gear is the output torque To on the carrier 54. The sun gear torque in the regenerative mode is applied to sheave 32 and is transmitted by belt 36 to sheave 30. Shaft 28 transmits the regenerative torque and the engine torque to the chain drive mechanism.

FIG. 4 shows graphically and algebraically how the engine torque and regenerative torque add to produce the torque transmitted by the chain drive mechanism to ring gear 50.

$$Te + \frac{(To/B)}{(1-R/S)} + \frac{(To/C)}{(1-S/R)} = 0$$

The belt speed ratio B is inversely proportional to the torque on sheave 32 divided by the torque on sheave 30; the chain speed ratio C is inversely proportional to the torque carried by sprocket 42 divided by the torque carried by sprocket 38.

At the shift point, when B and C are equal to 0.408 and if R/S=2, then $$Te/To = -(1/B)/(1-R/S)-(1/C)/(1-S/R)$$

$$Te/To = (1/B-2/C)$$

$$Te/To = (1/0.408)-(2/0.408) = 2.45$$

After the shift point and while operating in the regenerative mode, the transmission further reduces the output torque for a given engine torque and reduces the N/V ratio, which is the ratio of the engine speed divided by the vehicle speed, to a minimum value by continually increasing the belt ratio from its minimum value at the shift point back to its maximum value, ideally 2.45. This change is made by increasing the radius on sheave 32, where the drive belt engages that sheave, and decreasing the radius on sheave 30, where the drive belt engages that sheave. These changes progressively increase the speed of sheave 30 in relation to the speed of sheave 32 and decrease the torque on sheave 30 for a given output torque To.

Figure 6:
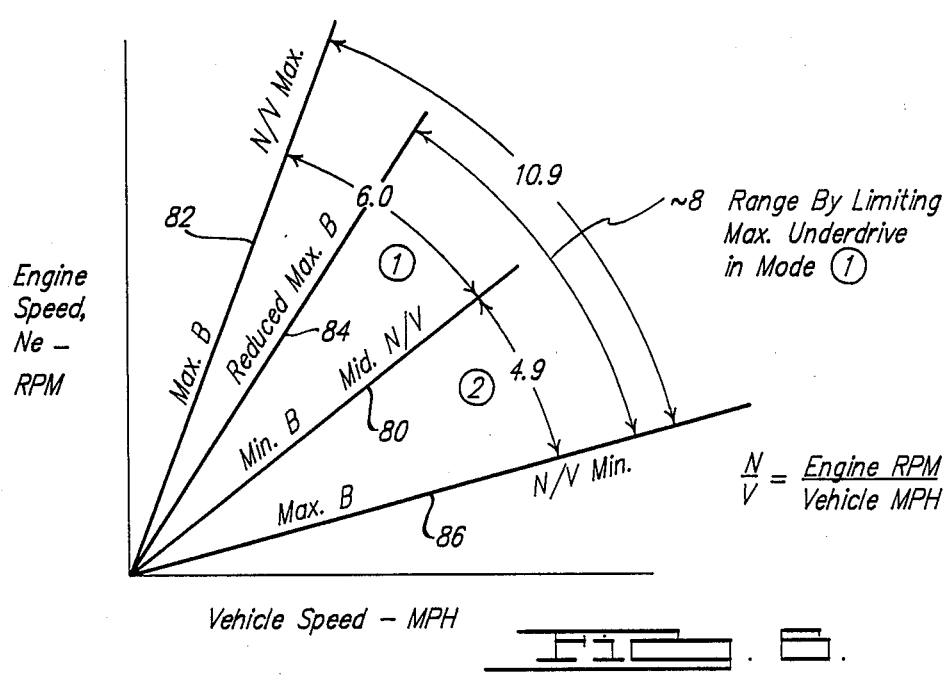
FIG. 6 shows in more detail than FIG. 5 the relationship between engine speed and vehicle speed for the transmission of this invention.

FIG. 6 shows the relationship between engine speed, in revolutions per minute, and vehicle speed, in miles per hour, as the transmission operates throughout the full range of the first and second modes. The points at which upshifts and downshifts are made are located on line 80 where the belt ratio has a minimum value and is equal to the chain drive ratio. The vehicle is accelerated from rest with the belt mechanism set at the maximum belt ratio, line 82, and this produces the maximum N/V ratio, i.e., the highest engine speed in relation to the vehicle speed. Thereafter, in the first mode, the belt ratio is reduced, line 84, toward the shift point, line 80, by increasing the size of sheave 30 and decreasing the size of sheave 32. This action increases vehicle speed for a constant engine speed. At the shift point, clutch 52 is disengaged and clutch 48 is engaged at a speed where they are substantially synchronous, and the transmission begins to operate in the regenerative mode described with reference to FIGS. 2 and 4. Thereafter, the belt ratio is increased from its minimum value to the maximum value by increasing the size of sheave 32 and decreasing the size of sheave 30. This action increases the N/V ratio still further and increases the vehicle speed in comparison to the engine speed until the minimum N/V ratio is reached at line 86. Then the transmission is operating at the maximum belt ratio in the regenerative mode.

FIG. 5 shows the relationship between engine speed and vehicle speed for a vehicle operating with the transmission of this invention powered by an engine whose range of throttle angle position is indicated in the figure. The throttle angles, expressed in degrees, represent only one means for determining the speed of the engine for a given applied engine load. Other means, such as the control of the air-fuel mixture ratio, the setting of the spark timing in relation to the piston position within the engine cylinder, etc. for controlling the engine speed can be substituted for throttle angle position.

Line 88 represents the maximum engine speed corresponding to various throttle angle positions 10°-50° through full open throttle FT at road load. Ideally, line 88 should intersect the minimum N/V line 86 near the throttle angle corresponding to approximately 10° or other low throttle angle.

Operation in the first mode is represented by the zone bounded by the vertical axis (Engine Speed) and line 80; operation in the regeneration mode is represented by the zone bounded by the horizontal axis (Vehicle Speed) and line 80. Line 90 represents the change in vehicle speed versus engine speed as the vehicle operates with the transmission in the first mode and second. mode and the throttle angle at 10°. The vehicle starts from rest with fluid coupling 20 stalled and the vehicle speed increases slowly as the coupling turbine 24 drives sheave 30 and as the engine speed increases to point 92. At that point, clutch 26 is engaged and the engine the speed drops to line 90, the speed consistent with the maximum underdrive belt speed ratio in the low mode at 10° throttle angle. The vehicle accelerates along line 90 to line 80 as the belt ratio declines. There, the transmission shifts from the first mode to the regeneration mode. Next, by increasing the belt ratio toward its maximum value, represented by line 86, the vehicle speed increases to point 94. To increase the vehicle speed further, the throttle angle position must be increased, whereupon line 88 defines the maximum vehicle speed. However, at each throttle angle setting greater than a minimum such as 10°, the maximum vehicle speed corresponding to the throttle angle results with a belt ratio less than the maximum belt ratio in the regeneration mode. For example, in the regeneration mode, when the throttle angle is at 30°, the belt ratio $B_k$ is greater than the minimum belt ratio but less than the maximum belt ratio. Line 96 represents in the regeneration mode the relationship between engine speed and maximum vehicle speed when the throttle angle is 30°. The maximum vehicle speed can be attained at the 30 degree throttle setting and road load condition with the belt ratio substantially less than its maximum value. Similarly, at the 40° throttle angle setting, maximum vehicle speed results though the belt ratio increases little after shifting to the regeneration mode. At the 50° throttle angle setting, maximum vehicle speed is produced at road load with the belt ratio at its minimum value.

The vehicle is accelerated from rest at the full throttle FT setting with the transmission operating in the first mode and the belt drive mechanism set at the maximum belt ratio position. In that condition, line 98 represents the relationship between engine speed and vehicle speed, but lockup clutch 26 can be engaged at any point on line 98 until the engine speed reaches its maximum engine power value, about 5000 rpm, at point 100. At this vehicle speed, the belt ratio is reduced toward the minimum value, represented by line 80, and the vehicle speed increases along line 102 to the maximum vehicle speed attainable at point 104.

FIG. 7 shows the transmission operating in the regenerative mode with overrunning clutch 46 locked, sheave 32 driving sheave 30, the chain mechanism driving shaft 44, and lockup clutch 26 mechanically connecting the engine output 10 with shaft 28, on which the regenerative torque of the belt drive mechanism, the engine torque and the chain drive mechanism torques are combined. The engaged state of clutch 48 is represented by a fixed mechanical connection between shaft 44 and ring gear 50. The disengaged state of clutch 52 is represented by the connection between sun gear and shaft 34, rather than a connection between shaft 34 and carrier 54.

If the vehicle operator rapidly depresses the accelerator pedal while the throttle angle is 30°, the transmission is in the regenerative mode and vehicle speed is the maximum for that throttle setting, the transmission will shift to the low mode. This so-called kickdown condition is represented in FIG. 5 where line 97 intersects the parabolic curve. Line 97 represents the same belt ratio in the first mode as line 96 represents in the regeneration mode. Therefore, after kickdown, the vehicle speed increases for the same belt ratio by the speed difference represented by the vertical line extending between the extremities of $\Delta B=0$ in FIG. 5. Thereafter, still greater vehicle speed results by increasing the belt ratio by the residual B amount until the maximum power vehicle speed line 102 is reached. The parabolic curve represents the engine speed after kickdown to a higher throttle angle, but with the belt ratio unchanged from its value while operating before kickdown in the regeneration mode.

Having described the preferred embodiment of my invention, what I claim and desire to secure by U.S. Letters Patent is:

1. A transmission for producing a stepless, continually variable range of ratios of the speed of its output to its input comprising:

means having an impeller adapted for connection to a power source and a turbine hydrodynamically connected to the impeller for hydrodynamically connecting the turbine and impeller;

a planetary gearset having a ring gear, a sun gear, a first set of planet pinions meshing with the sun gear, a second set of planet pinions meshing with the first set of pinions and with the ring gear, and a pinion carrier on which the first and second sets of pinions are rotatably supported;

first drive means drivably connecting the turbine and the sun gear for producing a variable speed ratio therebetween, said ratio being in a range between underdrive and overdrive;

second drive means drivably connecting the turbine and the ring gear for producing a fixed speed ratio in one direction therebetween, said fixed speed ratio being substantially equal to an underdrive speed ratio of the first drive means;

a first clutch means for drivably connecting and disconnecting the ring gear and the second drive means; and a second clutch means for drivably connecting and disconnecting the first drive means and the pinion carrier.

2. The transmission of claim 1 further comprising a first brake means for holding a member of the planetary gear set against rotation, whereby a direction of rotation of the carrier is reversed from its direction of rotation when said held member is released.

3. The transmission of claim 2 wherein the second drive means includes a first overrunning clutch means for producing a one way drive connection between the turbine and the ring gear.

4. The transmission of claim 3 further comprising a bypass clutch for mechanically connecting and disconnecting the impeller and turbine.

5. The transmission of claim 1 wherein the second drive means includes a first overrunning clutch means for producing a one way drive connection between the turbine and the ring gear.

6. The transmission of claim 1 further comprising a bypass clutch for mechanically connecting and disconnecting the impeller and turbine.

7. The transmission of claim 6 wherein the second drive means includes a first overrunning clutch means for producing a one way drive connection between the turbine and the ring gear.

8. The transmission of claim 7 further comprising a first brake means for holding a member of the planetary gear set against rotation, whereby a direction of rotation of the carrier is reversed from its direction of rotation when said held member is released.

9. The transmission of claim 6 further comprising a first brake means for holding a member of the planetary gear set against rotation, whereby a direction of rotation of the carrier is reversed from its direction of rotation when said held member is released.

10. The transmission of claim 1 further comprising a final drive gearset drivably connected to the planetary gearset for producing a speed reduction of the final drive gear set output relative to the planetary gearset output.

11. The transmission of claim 10 further comprising a first brake means for holding a member of the planetary gear set against rotation, whereby a direction of rotation of the carrier is reversed from its direction of rotation when said held member is released.

12. The transmission of claim 10 wherein the second drive means includes a first overrunning clutch means for producing a one way drive connection between the impeller and the ring gear.

13. The transmission of claim 12 further comprising a first brake means for holding a member of the planetary gear set against rotation, whereby a direction of rotation of the carrier is reversed from its direction of rotation when said held member is released.

14. A method for operating a transmission that produces a continually variable range of speed ratios of its output to its input and includes an impeller adapted for connection to a power source and a turbine hydrodynamically connected to the impeller and a lockup clutch for connecting the impeller and turbine mechanically, a planetary gearset having a ring gear, a sun gear, a first set of planet pinions meshing with the sun gear, a second set of planet pinions meshing with the first set of pinions and with the ring gear, and a pinion carrier on which the first and second sets of pinions are rotatably supported, a second drive drivably connecting the impeller and the ring gear for producing a fixed speed ratio therebetween, a belt drive drivably connecting the turbine and the sun gear for producing a variable speed ratio therebetween, and clutches for alternately connecting and disconnecting the various components, comprising the steps of:
engaging a first clutch connecting the pinion carrier and the belt drive;
disengaging the fixed speed ratio drive,
shifting the belt drive to a underdrive speed ratio position;
decreasing the belt ratio of the first drive means; and
engaging a second clutch connecting the fixed speed ratio drive and the ring gear and disengaging the first clutch when the speed of the ring gear and the speed of the sun gear are substantially the same.

15. The method of claim 14 further comprising decreasing the belt ratio of the belt drive while the first clutch is engaged and the second clutch is disengaged.

16. The method of claim 14 further comprising:
increasing the speed of the power source; and
decreasing the speed ratio of the belt drive while the first clutch is engaged and the second clutch is disengaged.

* * * * *